US007356232B1

(12) United States Patent
DiGiovanni et al.

(10) Patent No.: US 7,356,232 B1
(45) Date of Patent: Apr. 8, 2008

(54) OPTICAL FIBERS FOR HIGH POWER APPLICATIONS

(75) Inventors: David J DiGiovanni, Mountain Lakes, NJ (US); Jayesh Jasapara, Watchung, NJ (US); Andrew D. Yablon, Livingston, NJ (US)

(73) Assignee: Furukawa Electric North America, Norcross, GA (US)

( * ) Notice: Subject to any disclaimer, the term of this patent is extended or adjusted under 35 U.S.C. 154(b) by 0 days.

(21) Appl. No.: 11/497,223

(22) Filed: Aug. 1, 2006

(51) Int. Cl.
*G02B 6/02* (2006.01)
(52) U.S. Cl. .................................................... 385/123
(58) Field of Classification Search ......... 385/123–127
See application file for complete search history.

(56) References Cited

U.S. PATENT DOCUMENTS

| 5,963,700 | A | * | 10/1999 | Kato et al. ................. 385/127 |
| 6,018,533 | A | * | 1/2000 | Krivoshlykov ................ 372/6 |
| 7,130,514 | B1 | * | 10/2006 | Chen et al. ................. 385/123 |
| 2004/0247272 | A1 | | 12/2004 | Dawson et al. | |

OTHER PUBLICATIONS

Hadley et al., "Bent-waveguide modeling of large-mode-area, double-clad fibers for high-power lasers" Paper No. 6102-63 Proceedings of the SPIE vol. 6102, Fiber Lasers III: Technology, Systems, and Applications, Published by SPIE (Bellingham, Washington) 2006.

* cited by examiner

*Primary Examiner*—Quyen P Leung
(74) *Attorney, Agent, or Firm*—Peter V. D. Wilde; Michael A. Morra

(57) ABSTRACT

The specification describes optical fiber designs that overcome the problem of self-induced damage to optical fibers due to excessive self-focusing. The refractive index of these fiber designs is grossly non-uniform in the center core of the optical fiber. In one embodiment, the optical fiber is designed with a deliberate and steep core trench. In addition, the nominal core region of these optical fibers has a very large area. The combination of these two properties restricts a large portion of the optical power envelope to a core ring, with reduced optical power inside the core ring. These designs substantially reduce self-focusing in the optical fiber. Photonic systems employing optical fibers having these modified core designs are expected to be especially effective for transmitting high power, e.g., greater than 1 MW, with short pulse duration.

19 Claims, 5 Drawing Sheets

OPTICAL FIBERS FOR HIGH POWER APPLICATIONS

FIELD OF THE INVENTION

This invention relates to optical fibers that are specially designed to carry high optical power.

BACKGROUND OF THE INVENTION

At very high powers (approximately >1 MW) an optical beam increases the refractive index of the silica glass by an amount proportional to the local intensity. This can create a lens that focuses the beam down to a small spot (or a collection of small spots) causing optical damage. This process is termed self-focusing and has been extensively studied over the past several decades. (See R. W. Boyd, *Nonlinear Optics*, 2$^{nd}$. Edition, Academic Press, Boston, 2003.) Self-focusing serves as an upper limit on the maximum power that can be guided in materials such as silica glass, and this limit is often termed the critical power for self focusing, $P_{crit}$, which according to Fibich et al. (G. Fibich and A. L. Gaeta, "Critical power for self-focusing in bulk media and in hollow waveguides," *Optics Letters*, vol. 25, pp. 335-337 (2000)) can be estimated as:

$$P_{crit} = \frac{1.8362\lambda^2}{4\pi n_0 n_2} \quad (1)$$

where $\lambda$ is the wavelength, $n_0$ is the material's original refractive index, and $n_2$ is the nonlinear refractive index expressed in units of m$^2$/W such that the total refractive index, n, is given by $n=n_0+n_2 l$ where l is the local optical intensity in W/m$^2$. Since its refractive index, $n_0$, is about 1.45 and its nonlinear refractive index, $n_2$, is about $3\times10^{-20}$ m$^2$/W, at the commonly used laser wavelength of 1060 nm, $P_{crit}$ in silica glass is approximately equal to 3.8 MW. In other words, a bulk sample of silica glass will not be effective in guiding a 1060 nm optical beam at a power greater than about 3.8 MW because any light beam above this threshold power will rapidly focus to an infinitesimal spot size and damage the glass.

Equation (1) was thought to be valid for optical fibers as well as for homogeneous silica glass samples, thereby setting an upper limit on the peak power carrying capacity of any silica optical fiber. However, it turns out that certain specific optical fiber designs may suppress the inception of self-focusing and thereby permit such optical fibers to carry an optical signal with a power greater than Eq. (1) without self-focusing to the point of material damage.

Self-focusing is not the only limit to the power carried by optical fibers. Other important constraints include self-phase modulation, stimulated Brillouin scattering (SBS), stimulated Raman scattering (SRS), and dielectric optical breakdown. Unlike self-focusing, where the threshold is related to the total peak optical power, the threshold for these limitations as well as dielectric optical breakdown depends on the peak local intensity in the fiber. In general, avoidance of these limitations and dielectric optical breakdown is accomplished by increasing the effective modal area, $A_{eff}$, of the fiber. The effective area of an optical fiber mode is defined by $A_{eff}=(\int|E|^2 dA)^2/\int|E|^4 dA$ where E is the local electric field and the integrations are understood to be performed over the cross sectional area of the fiber. By increasing the effective modal area, the threshold power for intensity-dependent limitations can be elevated so that self-focusing becomes relatively more important. Calculations reveal that for near-infrared wavelengths and for reasonable $A_{eff}$ (<3000 μm$^2$), dielectric optical breakdown occurs at a lower power level than self-focusing when the pulse duration is about 1 ns or longer (including continuous wave signals). Since the present invention is designed to delay the onset of self-focusing, but is not designed to mitigate dielectric optical breakdown, it is expected to be most useful for fibers carrying high peak-power in pulse duration shorter than about 1 ns. The invention described here is intended for applications in which the peak optical power exceeds the conventional bulk-media self-focusing threshold. When the optical pulse length is relatively short, it is understood that the peak optical power will exceed the conventional bulk-media self-focusing threshold even though the average optical power integrated over a long time period may be well below the conventional bulk-media self-focusing threshold.

Distributing optical energy evenly across a large core optical fiber is one approach to maximizing the power capacity of the optical fiber without exceeding a threshold value of intensity-dependent limitations at any given point in the fiber. It is known that this can be achieved by engineering the refractive index profile of the optical fiber to produce a modefield with a flattened intensity profile as demonstrated in U.S. Patent Application Publication No. 2004/0247272. However it does not address the problem of self-focusing described above.

SUMMARY OF THE INVENTION

We have developed optical fiber designs that at least partly overcome the problems just described, mainly the problem of self-induced damage to optical fibers due to excessive self-focusing. The core refractive index of these fiber designs is grossly non-uniform in the center core of the optical fiber. In one embodiment, the optical fiber is designed with a deliberate and steep core trench. In addition, the nominal core region of these optical fibers has a very large area. The combination of these two properties restricts a large portion of the optical power envelope to a core ring, with reduced optical power inside the core ring. These designs substantially reduce self-focusing in the optical fiber. Photonic systems employing optical fibers having these modified core designs are expected to be especially effective for transmitting high peak optical power, e.g., greater than 1 MW, with short pulse duration.

DETAILED DESCRIPTION

Figure 1:
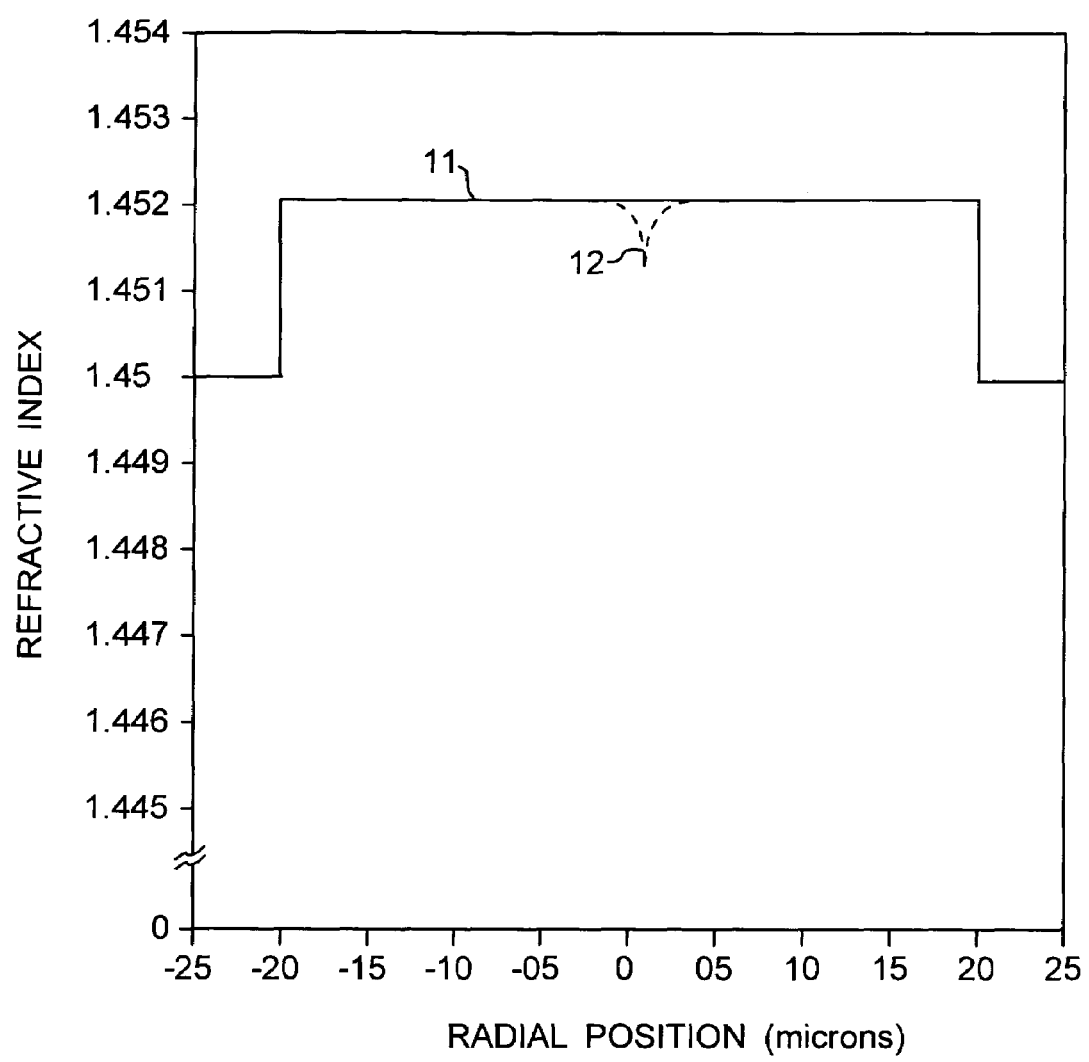
FIG. 1 is a refractive index profile for a conventional large mode area step index optical fiber, illustrated here for comparison with other optical fiber designs.

FIG. 1 shows a refractive index profile 11 for a conventional large mode area step index fiber. The plot is refractive index vs. radial position, and is idealized for the purpose of the description and analysis presented here. The core is typically Ge doped to an index value of approximately 1.452. The cladding shown here is pure silica with a nominal index of 1.45. The focus of these figures and this discussion is the core of the optical fiber. A wide variety of cladding structures, having un-doped layers, down-doped trench layers, up-doped layers for microbending control etc. may be used with the core structures described here.

FIG. 1 shows a large core, approximately 40 microns in diameter (with a fundamental LP01 modal effective area of approximately 750 $\mu m^2$ around 1 $\mu m$ wavelength). The large core serves to spread the modefield of the optical pulse and maintain the intensity below the threshold for damage.

However, as discussed above, even large core fibers like that represented by the profile of FIG. 1 suffer from the problem of self-focusing.

FIG. 1 also shows a common artifact in some step index optical fiber cores. It is the core dip shown at 12. This is a center region that is partially depleted of dopant due to processing. It occurs mostly in optical fibers produced by MCVD. In some cases it may be produced deliberately. See U.S. patent application Ser. No. 10/880,205, filed Jun. 29, 2004. Optical fiber manufacturing processes are designed to minimize or eliminate the core dip. In those cases where a core dip remains, the core dip is not a deliberate functional feature of the optical fiber design.

Although the optical fiber profile of FIG. 1 has a large core area, it does not avoid the problem of self-focusing. For a detailed technical analysis of the phenomenon of self-focusing in a bulk homogeneous material, such as a block of silica glass without a waveguiding core, see Boyd, "Nonlinear Optics" (2nd edition, Academic Press, New York, 2003 page 313, equations 7.1.2-7.1.7).

Considering the problem from simple ray-optic theory, if a focus occurs then this means that the optical path length of the marginal ray approaching such a focus is the same as the optical path length of a ray on the optical axis. We make the rough approximation that the ray on the optical axis experiences a refractive index that is equal to $n_0 + n_2 \times I$ (where the nominal linear index of the glass is $n_0$, and $n_2$ is the non-linear component, i.e. the coefficient for the index delta created by on-axis high intensity I). It is also assumed that the marginal ray experiences a refractive index of only $n_0$ (since the intensity is lower there). Since the optical paths of these two rays must be equal (optical path along optical axis=optical path for marginal ray), and using geometry, this equality becomes:

$$(n_0 + n_2 \times I) \times L = n_0 \times L / \cos(\theta) \quad (2)$$

where L is the physical distance along the optical axis to the focus and $\theta$ is the angle of the marginal ray relative to the optical axis.

Using algebra (and a simple approximation for $\cos(\theta)$ the angle $\theta$ can be expressed as:

$$\theta = (2 \times n_2 \times I/n_0)^{1/2} \quad (3)$$

Assuming the original beam had transverse beam width $2 \times w_0$ (in this case $2 \times w_0$ is like the mode field diameter) then the marginal ray must travel a transverse distance of $w_0$ to reach the optical axis. Accordingly, the approximate distance for self focusing, L, can be computed as:

$$L = w_0 \times (n_0/(2 \times n_2 \times I))^{1/2} \quad (4)$$

All of these relations are approximate and are entirely based on a ray-optic picture of self-focusing that is valid well above the threshold for self-focusing. Near the threshold for self-focusing, the convergence angle due to self-focusing ($\theta$) will approximately balance the diverging angle due to diffraction of the beam ($\gamma$):

$$\gamma = \lambda/(n_0 \times w_0 \times \pi) \quad (5)$$

where we have assumed that the transverse shape of the beam is approximately Gaussian. When the beam is approximately Gaussian in shape, the total power in the beam may be approximated as:

$$P = (\pi \times I \times w_0^2)/2 \quad (6)$$

Equations (3), (5), and (6) may be algebraically combined to show that when the angle of diffraction is balanced by the converging angle due to self-focusing ($\gamma = \theta$) then:

$$P = \lambda^2/(4 n_2 \pi n_0) \quad (7)$$

which is within a factor of 2 of the more exact solution presented in Equation (1). At higher powers the beam convergence due to self-focusing overpowers diffraction and the beam comes to a focus. At powers lower than Equation (7), diffraction overwhelms any convergence of the beam.

From the foregoing analysis it is concluded that the design goal for overcoming the self-focusing problem is to create a significant minimum in the optical intensity profile at the center of the optical fiber.

Figure 2:
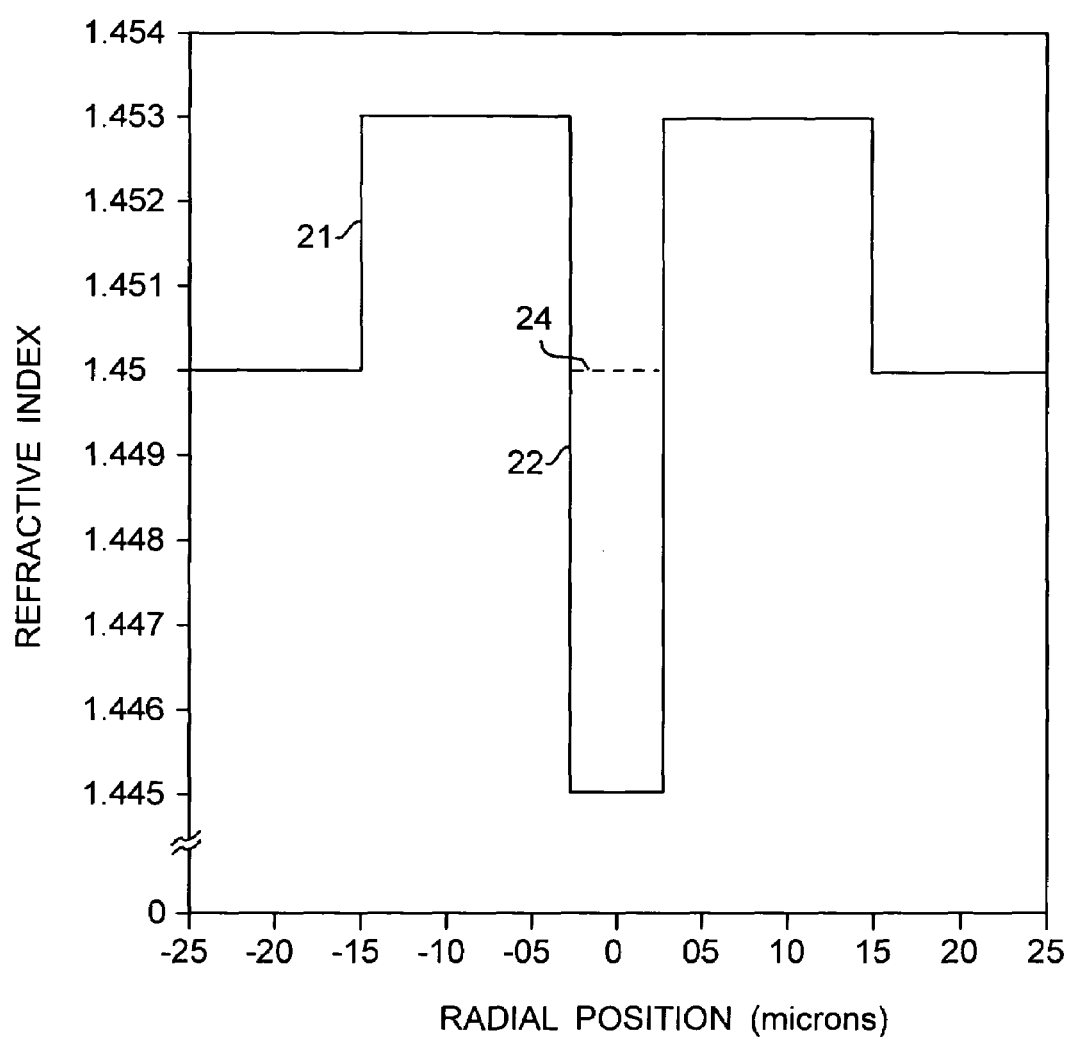
FIG. 2 is a refractive index profile for an optical fiber designed for the high power applications of the invention.

FIG. 2 shows one example of an optical fiber refractive index profile designed to overcome the self-focusing problem. The core 21 of the optical fiber in this design has a large area. The nominal area of the core shown in FIG. 2 is approximately 700 $\mu m^2$. The physical area of the core and the modefield diameter are related but not the same. In the context of this discussion and this invention, the modefield area ($A_{eff}$) can be considered a main property of interest, and is recommended to be greater than 150 $\mu m^2$ (as measured at a relatively low power level, e.g., below 0.1 MW peak power), and preferably greater than 300 $\mu m^2$.

Figure 5:
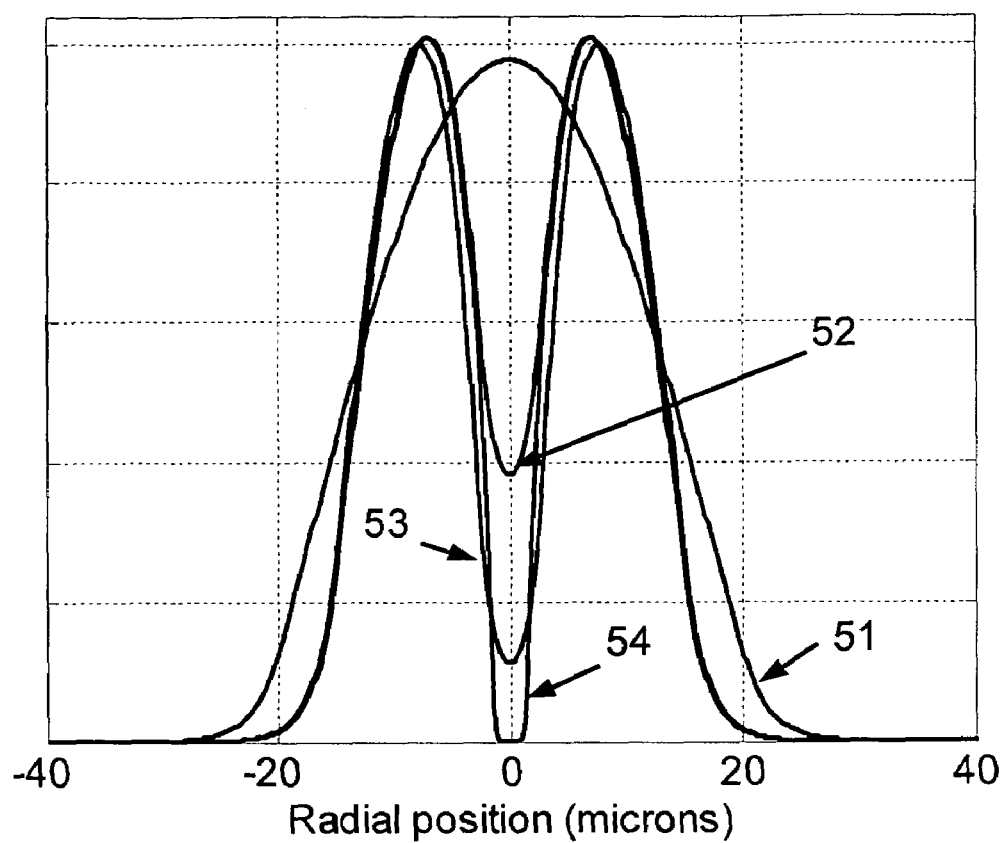
FIG. 5 is a plot showing the LP01 electric field amplitudes at low optical power levels corresponding to the waveguides depicted in FIGS. 1-3.

The optical fiber profile in the example shown in FIG. 2 has a center core with a depressed index region 22 approximately 6 microns wide, and very deep. This depressed region in the refractive index profile creates a local minimum in the optical intensity (or electric field amplitude) at the center of the optical fiber. This feature and the result of this feature can be expressed as a general condition using the mathematical formula:

$$\left. \frac{d^2 |E|}{dr^2} \right|_{r=0} > 0 \quad (8)$$

where |E| is the electric field amplitude. Numerical simulations have shown that optical fibers satisfying these two conditions, i.e., a core with a large effective area, and a central region having a local minimum in the optical intensity, exhibit an elevated self-focusing threshold. FIG. 5 shows the electric field computed at low optical power for the fiber designs (24 and 22) depicted in FIG. 2 (52 and 53 respectively), which clearly has a local minimum in the electric field amplitude at the center of the fiber. The electric field amplitudes can be computed for the various modes of the fiber using conventional numerical mode solving algorithms well known by those skilled in the art. The efficacy of a proposed fiber design can be evaluated by computing the desired signal mode at the operating wavelength based on the proposed index profile and the electric field amplitude (or optical intensity) can be checked to verify that a local minimum is present at the center of the fiber.

In some cases the presence of a minimum in the electric field can inhibit efficient optical coupling between the present invention and more conventional optical fibers exhibiting Gaussian-like mode field shapes. This can be overcome with the aid of mode field shape or size converting elements including bulk optical elements such as lenses or mirrors, as well as fiber based strategies such as those disclosed in US Provisional Patent Application Windeler and Yablon, Filed Dec. 16, 2005.

It should be understood that the minimum in the electric field described by equation (8) relates to the fundamental $LP_{01}$ mode propagating in the core region of the fiber. However, it should also be understood that the invention is applicable to cases wherein the signal mode is $LP_{02}$ or another mode.

As is evident from the above, the minimum in the electric field amplitude that is expressed by equation (8) can be obtained by producing a local minimum in the refractive index at the center of the core. In the usual case that minimum is less than the effective index of the fundamental mode. The width of the refractive index minimum also influences the depth of the minimum in the electric filed amplitude. The width of the refractive index trench will normally be larger than $\lambda/2n$, where $\lambda$ is the vacuum wavelength and n is the refractive index.

The depressed region 22 in the profile of FIG. 2 may be formed in several ways. A preferred method is to deliberately down-dope the center core region. Down-doped regions are conventionally produced by doping with F or B. General methods for doing this are well known. See for example, U.S. patent application Ser. No. 10/320,193, filed Dec. 16, 2002, and incorporated herein by reference. An alternative is to form an un-doped center core region. This will produce a profile represented by dashed line 24. The un-doped region can be produced easily in a conventional MCVD process by simply turning off the dopant sources, such as the Ge bubbler, during the last pass or passes of MCVD deposition. Additionally, the depressed region could be formed by reducing the concentration of up-dopants and/or increasing the concentration of down-dopants during the last pass or passes of MCVD deposition. Similar index profiles may be formed by other well-known fiber fabrication methods.

Figure 3:
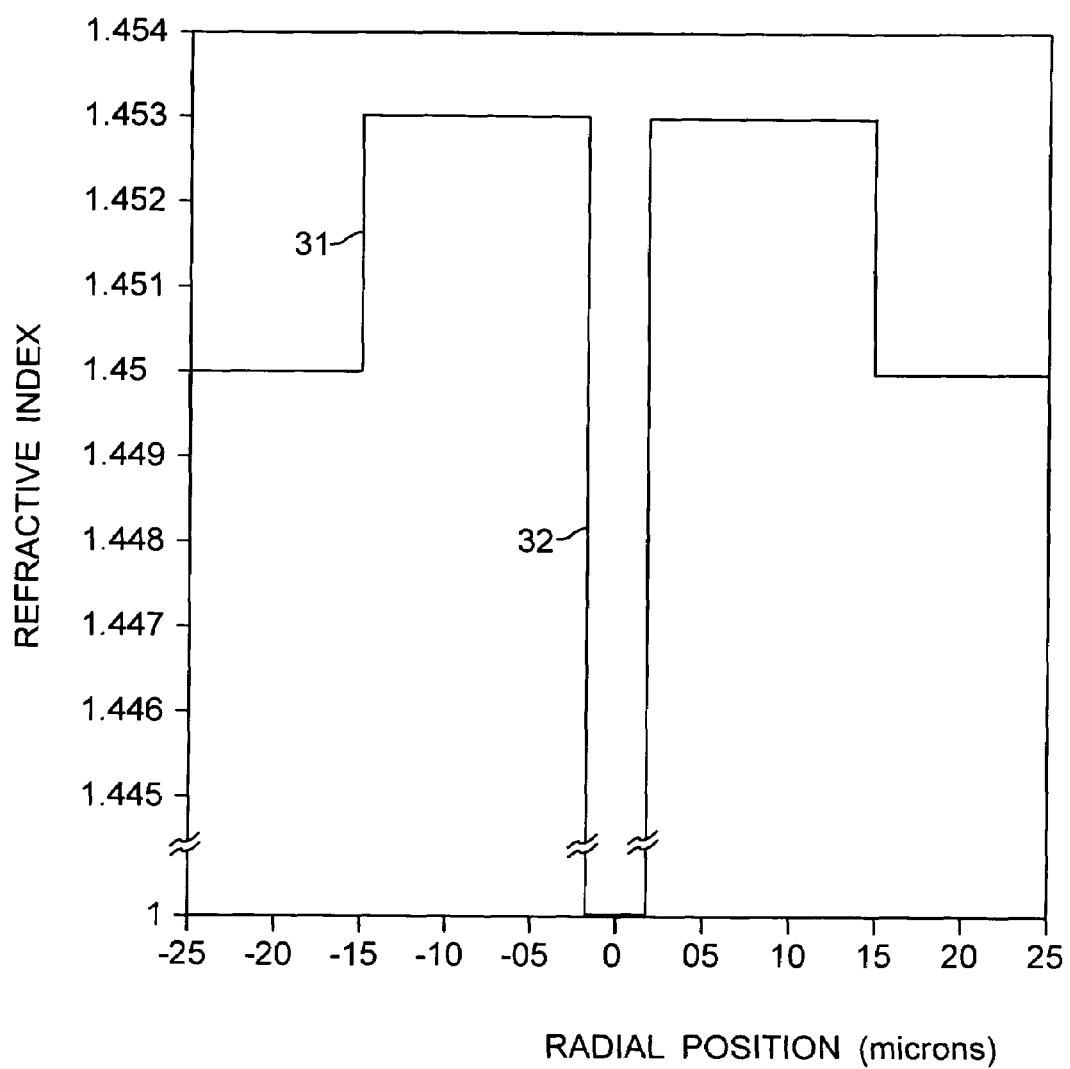
FIG. 3 is a refractive index profile for an optical fiber with an alternative design useful for the high power applications of the invention.

Another approach to addressing the self-focusing problem is represented by the profile of FIG. 3. Here the index of the center core trench region is reduced to 1, the index of air, by forming a hole or void in the center of the optical fiber. This will produce a very distinct depression in the optical energy at the center of the core of the optical fiber. Similar optical fiber structures have been described in the past. For example, so-called hollow core optical fibers were described by Bjarklev et al., Photonic Crystal Fibers, Kluwer, Boston, 2003, and hole-assisted optical fibers have been described by Li et al., "High Bandwidth Single Polarization Fiber With Elliptical Central Air Hole, IEEE Journal of Lightwave Technology, Vol. 23, No. 11, pp. 3454-3460. However, in these optical fibers the objective is to transmit the light in the hollow core. In the optical fiber of this invention, more than 50% of the optical energy is carried in the glass portion of the optical fiber. The hole is only to reduce the self-focusing property of the glass core. Accordingly, the diameter of the hole in the core is less than half the diameter of the core, and preferably less than one quarter of the diameter of the core. Moreover, the optical fibers described by Li et al. have elliptical cores. In the preferred case the optical fibers described here are essentially axisymmetric.

Figure 4:
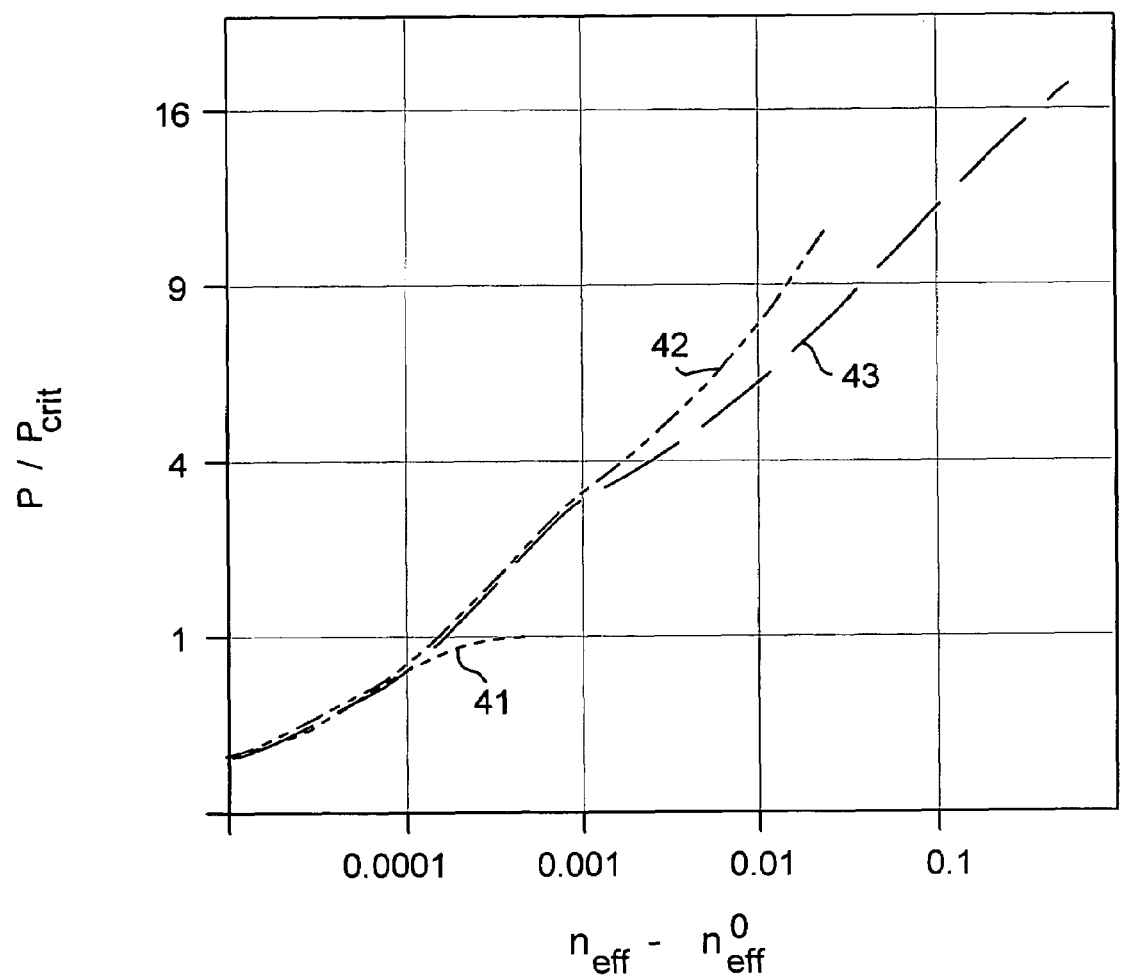
FIG. 4 is a plot showing variation of guided optical power of the fundamental LP01 mode with normalized modal effective index for the waveguides represented in FIGS. 1-3.

To demonstrate the stability of the fundamental propagating mode at high power in the optical fiber designs of the invention the variation of guided optical power of the fundamental $LP_{01}$ mode with normalized modal effective index was calculated. The normalized modal effective index is given by $n_{eff} - n_{eff}^0$ where $n_{eff}$ is the effective index of the mode when it is carrying high optical power ($P \sim P_{crit}$ or $P > P_{crit}$) and $n_{eff}^0$ is the effective index of the same mode at low powers ($P \ll P_{crit}$). The normalized modal effective index indicates the extent to which elevated optical power has perturbed the local refractive index. The effective index of a mode is defined by $n_{eff} = \beta \lambda/(2\pi)$ where the phase of the optical mode accumulates at a rate $\beta$ radians per unit distance. FIG. 4 plots the results for waveguides represented by FIGS. 1-3. Curve 41 represents data for an optical fiber with the profile shown in FIG. 1; curve 42 represents data for the profile 22 in FIG. 2; curve 43 represents data for the profile of FIG. 3. The nonlinear refractive index coefficient, $n_2$, was assumed to be the same regardless of silica dopant concentrations but similar curves would be obtained even when accounting for a variation of $n_2$ with dopant concentrations. The vertical scale in FIG. 4 is compressed for clarity, and the horizontal scale is logarithmic. The data was calculated by two independent means; a direct integration of the scalar non-linear Schrodinger equation and also by a cylindrically symmetric scalar finite-difference beam-propagation-method (FD-BPM). Both methods yielded data that closely tracks the curves in the figure.

It is evident from line 41 in FIG. 4 that the guided optical power asymptotically approaches $P_{crit}$ (as defined by equation (1)) for the fiber with index profile shown in FIG. 1. In contrast, the guided optical power is found to increase well beyond $P_{crit}$ for both fiber designs corresponding to the embodiments of the invention shown in FIGS. 2 and 3 (curves 42 and 43).

A concern for any numerical simulation of the fibers described here, when operating near or above $P_{crit}$ is the stability of the guided modes in the presence of small perturbations. If the guided modes are unstable, then any infinitesimal perturbation such as a small variation in refractive index profile may lead to catastrophic self-focusing and damage to the fiber. The stability of a fundamental $LP_{01}$, is preserved for small perturbations if $dP/dn_{eff}$ is greater than zero. See Kivshar et al., Optical Solutions: From Fibers to Photonic Crystals, Academic Press, New York, 2003. The optical energy carried by the fiber represented by curves 42 and 43 in FIG. 4 is shown to be stable even at powers greater than $P_{crit}$ both by the FD-BPM numerical simulation data, and also by the fact that $dP/dn_{eff}$ is greater than zero.

FIG. 5 shows the fundamental LP01 electric field amplitudes computed at low optical power for the fiber designs depicted in FIGS. 1, 2, and 3. Curve 51 corresponds to the perfectly uniform fiber refractive index profile 11 appearing in FIG. 1. Curve 52 corresponds to the fiber refractive index profile formed by curves 21 and 24 in FIG. 2. Curve 53 corresponds to the fiber refractive index profile formed by curves 21 and 22 in FIG. 2. Curve 54 corresponds to the fiber refractive index profile formed by curves 31 and 32 in FIG. 3. Curve 51 does not exhibit a minimum in the electric field and does not exhibit an elevated threshold for self-focusing.

In contrast, curves 52, 53, and 54 all exhibit minima in their electric field amplitudes at the center of the fiber and are also found to demonstrate an elevated threshold for self-focusing.

The electric field amplitudes can be computed for the various modes of the fiber using conventional numerical mode solving algorithms well known by those skilled in the art. The efficacy of a proposed fiber design can be evaluated by computing the desired signal mode at the operating wavelength based on the proposed index profile and the electric field amplitude (or optical intensity) can be checked to verify that a local minimum is present at the center of the fiber.

A simplified physical explanation for the efficacy of the present invention is as follows. In an axisymmetric waveguide such as a typical optical fiber, catastrophic self-focusing will normally occur when most of the optical signal focuses itself into the very center of the axis of symmetry (here, the very center of the fiber). Following the teachings described here, the refractive index at the center of the fiber is deliberately set low enough that the optical energy is inhibited from entering the center region of the fiber. Although some fraction of the optical energy will penetrate into the central depressed-index region of the fiber core (region 22 in FIG. 2), most of it remains in the core surrounding the central depressed-index region (region 21 of FIG. 2). This creates a ring in the core, where the optical intensity is highest. Since the presence of a high optical intensity raises the local refractive index, the ring where the optical intensity is highest serves as a pseudo-core, where the bulk of the light is guided, and which further inhibits optical energy from entering the center of the core. Moreover, as the light intensity increases the pseudo-core effect actually grows.

It is understood that as the optical power approaches and exceeds the bulk media critical power, $P_{crit}$, the effective area $A_{eff}$ of the signal mode will be reduced because of the intensity-induced perturbations to the index profile of the fiber. However, if the $A_{eff}$ of the fiber at low power ($P \ll P_{crit}$) is high-enough, then this reduction in $A_{eff}$ will not be sufficient to permit intensity dependent nonlinearities, such as dielectric optical breakdown, to impair the fiber.

While the high-power regime that is addressed here in terms of reduced self-focusing is mentioned earlier as above 1 MW, the power level where the effect begins to set in can be more precisely prescribed in terms of equation (7), which can be expressed in terms of an optical signal source wherein the optical signal has peak optical power greater than $\lambda^2/(4\pi n_0 n_2)$ anywhere within the optical fiber, where $\lambda$ is the vacuum wavelength, $n_0$ is the unperturbed (linear) refractive index, and $n_2$ is the nonlinear refractive index expressed in units of $m^2/W$.

The terms up-doped and down-doped as used herein are terms well known to those skilled in the art. An up-doped glass or glass region is one that is doped to have a refractive index greater than that of pure silica. A down-doped glass or glass region is one that is doped to have a refractive index less than that of pure silica. Typically the host material is silica.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. Optical fiber comprising a core and a cladding wherein the signal mode has an effective area greater than 150 μm² measured at optical power below the bulk material threshold for self-focusing and an electric field amplitude at the center of the core given by:

$$\left.\frac{d^2|E|}{dr^2}\right|_{r=0} > 0$$

where |E| is the electric field amplitude, and r is the radius of the core, wherein the core comprises a ring having a first refractive index, surrounding a center core depressed region with a substantially lower refractive index and further wherein the refractive index in the center core depressed region is less than the effective refractive index of the signal mode.

2. The optical fiber of claim 1 wherein the effective area of the signal mode is greater than 300 μm² at optical powers well below the bulk material threshold for self-focusing.

3. The optical fiber of claim 1 wherein the width of the center core depressed region is greater than λ/2n, where λ is the vacuum wavelength and n is the refractive index.

4. The optical fiber of claim 1 wherein the center core depressed region has refractive index less than or equal to that of silica.

5. The optical fiber of claim 1 wherein the center core depressed region comprises a void.

6. The optical fiber of claim 5 wherein the ring carries more than 50% of the optical power.

7. Optical fiber system comprising in combination:
   (a) an optical fiber comprising a core and a cladding wherein the signal mode has an effective area greater than 150 μm² measured at optical power below the bulk material threshold for self-focusing and an electric field amplitude at the center of the core given by:

$$\left.\frac{d^2|E|}{dr^2}\right|_{r=0} > 0$$

where |E| is the electric field amplitude, and r is the radius of the core, and
   (b) an optical signal source coupled to the optical fiber the optical signal having peak optical power greater than $\lambda^2/(4\pi n_0 n_2)$ anywhere within the optical fiber where $\lambda$ is the vacuum wavelength, $n_0$ is the unperturbed (linear) refractive index, and $n_2$ is the nonlinear refractive index expressed in units of $m^2/W$.

8. The optical fiber system of claim 7 wherein the core comprises a ring having a first refractive index surrounding a center core depressed region with a substantially lower refractive index.

9. The optical fiber system of claim 8 wherein the center core depressed region has refractive index less than or equal to that of silica.

10. The optical fiber system of claim 8 wherein the center core depressed region comprises a void.

11. Method for transmitting optical signals comprising propagating an optical signal through an optical fiber the optical signal having peak optical power level greater than $\lambda^2/(4\pi n_0 n_2)$ anywhere within the optical fiber where $\lambda$ is the vacuum wavelength, $n_0$ is the unperturbed (linear) refractive index, and $n_2$ is the nonlinear refractive index expressed in units of m²/W and the optical fiber comprising a core and a cladding wherein the signal mode has an effective area greater than 150 μm² measured at optical power below the bulk material threshold for self-focusing and an electric field amplitude at the center of the core satisfying:

$$\left. \frac{d^2 |E|}{dr^2} \right|_{r=0} > 0$$

where |E| is the electric field amplitude, and r is the radius of the core.

12. The method of claim 11 wherein the core comprises a ring having a first refractive index surrounding a center core depressed region with a substantially lower refractive index.

13. The method of claim 12 wherein the center core depressed region has refractive index less than or equal to that of silica.

14. The method of claim 12 wherein the center core depressed region comprises a void.

15. The method of claim 14 wherein the ring carries more than 50% of the optical power.

16. Optical fiber system comprising in combination:
   (a) an optical fiber comprising a core and a cladding wherein the signal mode has an effective area greater than 150 μm² measured at optical power below the bulk material threshold for self-focusing and an electric field amplitude at the center of the core given by:

$$\left. \frac{d^2 |E|}{dr^2} \right|_{r=0} > 0$$

where |E| is the electric field amplitude, and r is the radius of the core, and
   (b) an optical signal source coupled to the optical fiber, the optical signal source having a pulse duration of less than 1 ns.

17. The optical fiber system of claim 16 wherein the core comprises a ring having a first refractive index surrounding a center core depressed region with a substantially lower refractive index.

18. The optical fiber system of claim 17 wherein the center core depressed region has refractive index less than or equal to that of silica.

19. The optical fiber system of claim 16 wherein the center core depressed region comprises a void.

* * * * *